May 10, 1927.
C. A. KELSEY
1,628,409
CONTROL SYSTEM FOR ELECTRIC MOTORS
Filed Oct. 15, 1925
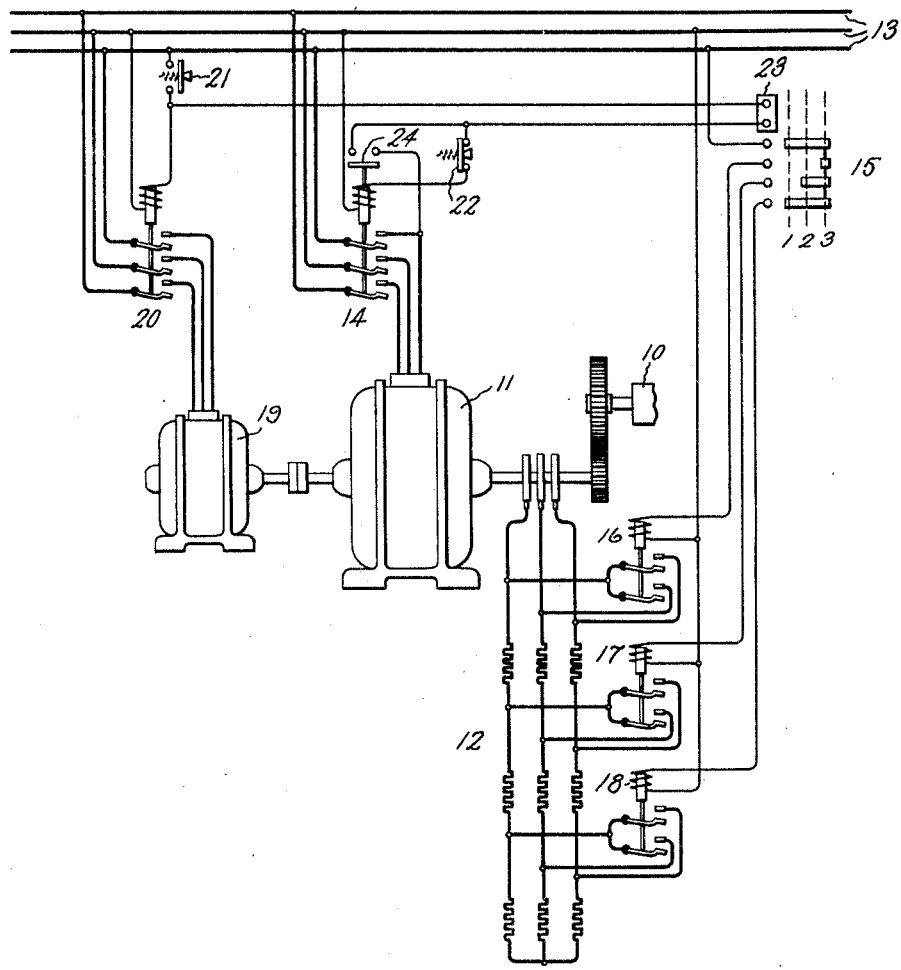
Inventor:
Charles A. Kelsey,
by *Alexander S. Lunt*
His Attorney.

Patented May 10, 1927.

1,628,409

UNITED STATES PATENT OFFICE.

CHARLES A. KELSEY, OF SCHENECTADY, NEW YORK, ASSIGNOR TO GENERAL ELECTRIC COMPANY, A CORPORATION OF NEW YORK.

CONTROL SYSTEM FOR ELECTRIC MOTORS.

Application filed October 15, 1925. Serial No. 62,615.

My invention relates to improvements in control systems for electric motors of the alternating current type whereby an accurate speed regulation of a driven load may be had and other advantageous starting and speed reduction characteristics for the driven load secured.

The desired speed torque characteristics for driving a load by means of a single alternating current adjustable varying speed motor are frequently difficult of attainment. Thus, if the load is driven by means of an alternating current motor of the type having adjustable speed regulating resistance in the secondary of the motor, the speed regulation characteristics of the ordinary motor of that type for starting, running and speed retardation of the driven load will be such that if those characteristics are made the most suitable, for instance, for normal running conditions, they will leave something to be desired for the attainment of a definite low speed at starting or the attainment of such speed by reinserting resistance in the secondary of the motor for the purpose of reducing the speed of the motor after operation at a higher speed.

The object of my invention is to provide a system whereby the desired speed torque characteristics of the driving means may be had for all of the ordinary conditions encountered in the operation of the driven load.

In carrying the invention into effect in the form which I now regard as the preferred form thereof, I employ a second alternating current motor mechanically connected to the main adjustable varying speed driving motor and having a lower synchronous full running speed than said main motor. The connection of this second motor to the supply circuit is so controlled that at starting the driven load, both motors are employed, the main motor speed adjusting means being required to be in position to effect slow speed operation of the main motor. A comparatively high starting torque is thus secured and the load will be accelerated to a definite speed which is substantially the synchronous speed of the second motor. In order to increase the speed of the driven load, the second motor is disconnected from the supply circuit and the speed adjusting means of the main motor is suitably governed. The connections are such that when the said speed adjusting means is operated to decrease the speed to the said definite low speed, the second motor is automatically reconnected to the supply circuit to act as a dynamic brake on the main motor and the driven load and to establish the said definite slow speed.

For a better understanding of the invention, reference is had to the accompanying drawing which shows in very simple diagram a motor control in accordance with the invention. The driven machine is indicated merely at 10, and this machine is connected through the gearing indicated to the main motor 11. This motor is preferably of the alternating current adjustable varying speed wound rotor slip ring type with speed adjusting resistors 12 in the rotor circuit thereof. The primary winding of this motor is arranged to be connected to the three phase alternating current supply circuit 13 by means of the contactor 14, and the speed adjusting controller 15 is provided for controlling the contactors 16, 17 and 18 to successively shunt the sections of the resistor 12 in the secondary of the motor 11. The auxiliary motor 19 is mechanically connected with the rotating element of the main motor 11, and this motor 19 is constructed so as to have a lower synchronous full running speed than the motor 11. The motor 19 is preferably of the squirrel cage secondary type, since motors of this type are comparatively inexpensive and the characteristics of such a motor are suitable for the purposes desired when used in connection with the inherent characteristics of the motor 11. The motor 19 is arranged to be connected to the supply circuit 13 by means of the line contactor 20. The line contactors 20 and 14 are under the control of the start push button 21 and the stop push button 22.

As thus constructed and arranged and with the parts in their respective positions as shown in the drawing, the operation of my invention is as follows: In order to start the driven machine, the start push button 21 will be temporarily closed, thereby energizing the line contactor 20 of the motor 19 directly from the supply circuit 13, and energizing the winding of the line contactor 14 through the segment 23 of the controller 15 and the stop push button 22. It will be noticed that the controller 15 must be in the position indicated in the drawing in which all of the resistance 12 is included in the secondary circuit of the main motor 1 in order that the main motor line contactor 14 can be energized and the main motor connected to the supply circuit. This insures that there will be a high starting torque applied to the driven machine 10, and it will be observed that the starting torque of the auxiliary motor 19 is added to and supplements the starting torque of the main motor 11. The driven machine will be accelerated to substantially the synchronous speed of the motor 19 and it will be noticed that the speed of the driven machine will be maintained substantially constant at this predetermined low speed. That is because of the fact that in case the main motor 11 should tend to run at a speed lower than the synchronous speed of the motor 19, the motor 19 will be effective to raise the speed of the driven machine. If the speed of the motor 11 should tend to be in excess of the synchronous speed of the motor 19, the motor 19 will operate as an asynchronous generator returning power to the supply circuit 13 and acting as a dynamic brake on the motor 11 so as to hold this motor from materially departing from the synchronous speed of the motor 19.

When the line contactor 14 for the motor 11 closes, it also closes a maintaining circuit for the winding thereof through the stop push button 22 and the auxiliary switch 24 of the line contactor 14. A temporarily established circuit for the contactor 20 is also completed through the auxiliary switch 24 and through the segment 23 of controller 15. The controller 15 may then be operated so as to regulate the effect of the resistor 12 in the secondary circuit of the main motor 11. When the controller 15 is moved out of the position indicated in the drawing, the line contactor 20 for the auxiliary motor 19 will be deenergized by the opening of the winding circuit thereof at the segment 23 and this motor will be disconnected from the supply circuit 13 so that only the motor 11 is now in driving relation with respect to the load. The rotating element of the motor 19 will now be driven idly. When the controller 15 is moved toward the left to the position designated 1, the contactor 18 will be energized to shunt the lower sections of the speed regulating resistance 12, and when the controller 15 is moved to the position designated 2, the contactor 17 will be energized to shunt the middle and lower sections of the resistance 12, and then when the controller is moved to the position designated 3, the contactor 16 will be energized to shunt all of the resistance 12 and establish the full speed running condition for the motor 11.

In order to reduce the speed of the driven load to approximately the synchronous speed of the auxiliary motor 19, the controller 15 is returned to the position indicated in the drawing, thereby automatically reenergizing the line contactor 20 of the motor 19, the circuit being through the segment 23 of the controller 15 and the auxiliary switch 24 of the line contactor 14. The motor 19 thus acts as a dynamic brake of the motor 11 and the driven load since this motor is at this time being operated at a speed in excess of the synchronous speed thereof. The speed of the driven machine will be very quickly reduced to approximately the synchronous speed of the motor 19 and the motor 19 will serve to maintain substantially constant the speed of the driven machine at the definite low speed determined by the synchronous speed of the motor 19. In order to stop the driven machine, the stop push button 22 is depressed, thereby deenergizing the line contactor 14 of the motor 11 and thus in turn effecting the deenergization of the line contactor 20 of the motor 19.

What I claim as new and desire to secure by Letters Patent of the United States, is,—

1. In a control system for electric motors, a variable speed alternating current motor, adjustable speed regulating means therefor, a second alternating current motor mechanically connected to said first motor and having a lower synchronous speed than that of the first motor, controlling switch mechanism for said motors, and connections requiring operation of said switch mechanism to effect simultaneous energization of said motors with the said speed regulating means adjusted for a low speed of said first motor for starting at a definite low speed, subsequently requiring the continued energization of said first motor and the deenergization of said second motor for running at higher speeds, and then requiring the simultaneous energization of said motors with the said speed regulating means adjusted for a low speed of said first motor to reduce the speed of the motors to the said definite low speed.

2. In combination in a system of motor control, an alternating current motor of the type having a wound rotor with slip rings, speed regulating resistance in the rotor circuit of said motor, a second alternating current motor mechanically connected to said first motor, said second motor having a lower synchronous speed than said first motor, a controller, a start push button, line contactors for said motors, and connections between said controller, said push button and said contactors necessitating the said controller being in a definite position to effect slow speed operation of said first motor and requiring operation of said push button to energize said contactors to start said motors with the said resistance in the rotor circuit of said first motor, after which operation of said controller deenergizes the line contactor for said second motor and effects a variation of the said resistance, the said connections being such that subsequently returning said controller to said definite position effects the energization of the line contactor for said second motor to cause the second motor to act as a dynamic brake on said first motor.

3. In combination in a system of motor control, an alternating current motor of the type having a wound rotor with slip rings, speed regulating resistance in the rotor circuit of said motor, a controller, a second alternating current motor mechanically connected to said first motor and having a lower synchronous speed than said first motor, and electrical connections through which the said controller effects the control of the connection of said motors to a source of supply and the control of said resistance, the said connections requiring the controller to be in a definite low speed position in order to connect both motors to the source of supply, effecting the disconnection of the second motor from the source and the reduction of said resistance when the controller is operated out of said position and effecting the reconnection of said second motor to the source and the reinclusion of said resistance in the rotor circuit of said first motor when the controller is returned to said definite position.

In witness whereof, I have hereunto set my hand this 14th day of October, 1925.

CHARLES A. KELSEY.